Dec. 11, 1956     D. GRINGER     2,773,528
KEYHOLE SAW WITH ROTARY ADJUSTMENT FOR THE BLADE
Filed Oct. 31, 1955
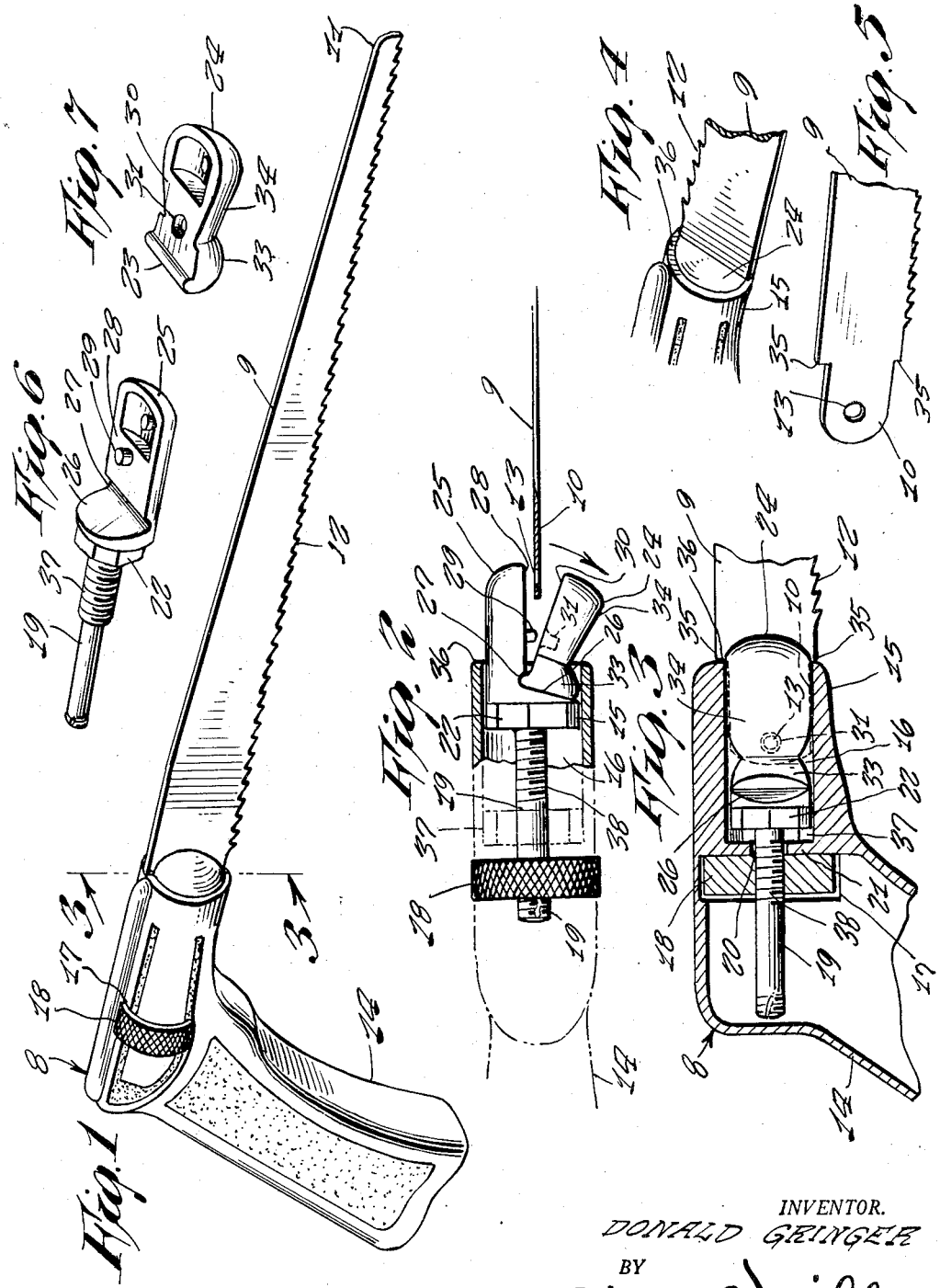
INVENTOR.
DONALD GRINGER
BY
Carl Miller
ATTORNEY

United States Patent Office 2,773,528
Patented Dec. 11, 1956

2,773,528

KEYHOLE SAW WITH ROTARY ADJUSTMENT FOR THE BLADE

Donald Gringer, New York, N. Y., assignor to Louis Gringer, New York, N. Y.

Application October 31, 1955, Serial No. 543,751

3 Claims. (Cl. 145—31)

This invention relates to saws and saw handles and the like wherein the saw and handle form a combination, and particularly to a rotary keyhole saw.

The main object of my invention is to provide a saw blade with a special handle capable of gripping it securely upon both sides of the shank thereof in order to ensure accurate sawing.

Another object of my invention is to provide a special saw blade with an adjustable handle capable of engaging with an aperture in the shank of the saw blade to prevent loss of the blade or even displacement thereof during use.

A further object of the invention is to have such a saw blade and handle that co-operate to form a rigid unit when in use in order to facilitate easy sawing and perfect control at all times.

Yet another object is to have a saw handle for engaging with and clamping the shank of the saw blade and placing it under tension to ensure a firm hold on the blade in several ways simultaneously.

It is, of course an object withal, to have a saw blade and co-operating handle which may be manufactured and sold at a reasonable figure in order to encourage wide distribution on the market.

It is even a practical object of this invention to have a saw and handle couple which forms a simple but effective tool easily manipulated and readily capable of having the saw blade replaced or renewed at will.

Other objects and advantages will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of a rotary keyhole saw made according to my invention and embodying the same in a practical form;

Figure 2 is a fragmentary plan view of the same saw, partly in section to reveal constructional and operational detail;

Figure 3 is a vertical longitudinal section of the saw as taken on line 3—3 in Figure 1;

Figure 4 is a fragmentary perspective view of the saw clamping end of the handle with a portion of the saw blade extending therefrom;

Figure 5 is a perspective view of the same or anchoring end of the saw blade;

Figure 6 is a perspective view of the main blade clamping member for engaging with and clamping the saw blade upon its shank;

Figure 7 is a perspective view of the mating clamp portion adapted to co-operate with the clamping member of Figure 6.

Throughout the views, the same reference numerals indicate the same or like parts and features.

Mechanics who use tools, especially saws, frequently find it a problem to saw out small areas in panels and the like, expertly and cleanly due to lack of well controlled small saws and tools. Especially when such small holes are to be sawed as keyholes and slots, which require perfect control of very narrow and small type saws. Of course, small saws do exist, but each is special and permanently secured to its handle and neither handle nor saw blade can be altered, adjusted or renewed as a matter of course.

Upon considering this problem, it has occurred to me that a saw should primarily include a saw blade of some simple form that will allow it to be gripped and retained by appropriate means, and a special adjustable clamping handle for releasably and adjustably clamping and retaining the saw blade firmly associated therewith. As a result of such consideration, I have succeeded in producing a rotary keyhole saw along the lines already alluded to, which will now be described in detail in the following.

Hence, in the practice of my invention, and referring also again to the drawing, the saw as tool, generally indicated at 8, primarily includes the blade 9 which tapers from its shank 10 to the outer end 11 and has one edge provided with saw teeth 12. The shank has an aperture 13 for a purpose that will presently appear.

In order to hold the saw, a handle 14 is provided which has an upper longitudinal hollow cylindrical extension 15 having the open cavity 16 therein directed away from the handle 14 proper. Intermediate the upper extension 15 are located a pair of opposite open slots 17 for receiving a knurled adjusting nut 18 screwed upon a threaded screw or bolt 19 extending through a hole 20 in the metal wall or partition 21 in the interior of handle portion 15 into the chamber or cavity 16 in which the head 22 of this bolt is located. To this head is fixed a clamping member with a transverse groove or fulcrum for receiving the lateral rounded end 23 of a swiveling clamping member 24, to be further noted. The clamping member 25 is integral with bolt head 22 with its inclined top face 26 and groove 27 disposed between inclined surface 26 and the substantially flat clamping surface 28 of the member 25 which is provided with an integral pin 29 for engaging with aperture 13 of the saw blade 9. The second clamping member 24 has also a clamping face 30 to face surface 28 of member 25 and is provided with a recess 31 for receiving pin 29 when the two clamping members 24 and 25 are brought together.

The two clamping members are thus mutually engaged by the end or rib 23 of member 24 fitting rockably in groove 27 of member 25, the inner end of second member 24 being rounded at 33 to clear the wall of handle extension 15 to allow rocking of member 24 on rib and groove fulcrum 23 and 27 engagement. The outer form of member 25 is semi-cylindrical in order to be slidable through hollow handle portion 15, while the outer end of member 24 is tapered inwardly toward its inner larger end 33 at 34 in such fashion that if this clamping member 24 is withdrawn rearwardly into the handle portion 15, the latter will gradually push the end toward the other member 25 to close both members into clamping relation for holding the shank 10 of saw blade 9 between them. The outline curvature of inner end 33 is such that the wall of handle portion 15 prevents rib or rounded end 23 from being displaced from groove 27 in any angular position of second clamping member 24 with respect to member 25. When the shank 10 of blade 9 is inserted between the flat portions 28 and 30 of both members and the pin or stud 29 caused to enter hole 13 of the saw blade, withdrawing the members into the handle portion 15 will close these members upon the blade shank.

It should be noted that the saw blade has a pair of shoulders 35, 35 at the inner end of shank 10 which together form a stop portion upon the saw to abut the end 36 of handle portion or casing 15 and prevent the blade from entering farther into this portion. The outer portion of the open cavity or chamber 16 in the latter is cylindrical, but in the inner end at 37, this cavity is hexagonal or octagonal to correspond to the hexagonal or octagonal shape of the head portion 22. This allows the blade with both clamping members to be turned angularly to any desired angle for the saw before setting it tightly into position, which is accomplished by screwing up the knurled nut 18 on thread 38 on bolt shank 19, the nut drawing the shank rearwardly into the handle 14 through partition 21 and the clamping ends of both members 24 and 25 into handle portion 15 until the shoulders 35 of the saw blade meet the end of portion or casing 15. This occurs simultaneously with the entry of the octagonal head 22 of clamping member 25 into octagonal end of chamber 16, and when the nut 18 is frictionally pressed against the wall 21 of the handle, the saw blade 9 is virtually locked in position both angularly and longitudinally so as to project rigidly from between the two clamping members 24 and 25 and handle portion 15.

The length of shank 19 is selected to be just sufficient to allow the nut in loosened position thereon to reach the rear end 39 which is mutilated to prevent the nut from riding off the shank and holding the main clamping member 25 in the position of Figure 2, in which the other clamping member 24 is retained within part of handle portion 15 in such fashion as to prevent loss of either clamping member from connection with the handle. The blade may be released by unscrewing nut 18 sufficiently to allow member 24 to swing free as shown in Figure 2, when the blade may be removed and replaced, as desired. Screwing up the nut 18 will again draw the clamping portions of members 24 and 25 into handle portion 15 and clamp the saw blade to the handle. No tools are required to insert or release the saw blade, and the latter may be quickly removed for storing the saw in a tool box. The shank 19 may be free from threads along a part of its length, if desired, to facilitate quick sliding of the clamping members to and from clamping positions.

The octagonal form of head 22 allows the clamping members and saw blade to be set in any one of eight angular positions, as already intimated, and in any such position, the saw blade is firmly held.

Naturally, the saw may be made in any practical size, and the head 22 may be hexagonal or only square, if desired, and then the inner end of chamber 16 will be hexagonal or square to correspond, as the case may be. It is evident that the saw handle and its features involve no loose parts to be lost, and the shorter clamping member 24 may be hinged or swung upward so as to allow clear vision of the pin or stud 27 for locating the shank of the saw blade to cause the hole 13 to fit the pin. Furthermore, by merely loosening the knurled nut 18, the clamping members will not open sufficiently to release the saw blade 9 but will yet allow the octagonal head 22 of the main clamping member to be temporarily removed from the inner octagonal end 37 of chamber 16 to allow the nut 18, shank 19, head 22, and both clamping members to be axially rotated to desired angular position, when screwing up the nut on thread 38 on shank 19 will again draw the head into engaged position within octagonal end 37 of cavity or chamber 16 and fix the parts against rotation and the saw firmly again in position for use.

While clamping member 25 and the parts, such as shank 19 and octagonal head 22 thereof have been expressed as separate parts, yet they form an elongated unit or main clamping unit, while the second clamping member 24 is relatively short and hinges or fulcrums upon the mentioned elongated unit in groove 27, as already described.

Manifestly, variations may be resorted to, and parts and features may be modified or used without others within the scope of the appended claims.

Having now fully described my invention, I claim:

1. A keyhole saw, including a handle having a hollow open end, a pair of mutually mating clamping members fitting in the open end in clamping position for clamping a saw blade between them with the blade extending from the handle, one clamping member having a transverse groove in its inner surface and the other clamping member having a corresponding rounded end on its inner surface rockably fitting into the groove to form a fulcrum for said other clamping member to hinge upon the one clamping member to open and close both clamping members for releasing and clamping the saw blade therebetween, means for withdrawing said clamping members into the end of said handle to retain said saw blade in position which includes having the handle hollow rearwardly of the hollow open end thereof and formed with side slots, an elongated shank connected to the one clamping member and extending into the rearward hollow portion of said handle with a thread upon at least a portion of said shank, a knurled nut mounted upon the threaded portion of said shank and extends to the exterior of said handle through said side slots, a partition wall transversely disposed within the handle and having a hole through which the shank from the one clamping member extends in effective position to dispose the knurled nut rearwardly of said partition wall, the inner end of the open end of the handle having a polygonal cross section, and the mentioned one clamping member at the junction of the shank therewith having a corresponding polygonal head fitting said inner end of said open end of the handle in a plurality of angularly different positions.

2. A rotary keyhole saw according to claim 1, wherein the two clamping members have opposed corresponding clamping surfaces coinciding with the longitudinal axis of the shank upon the one clamping member, and wherein one clamping member upon its clamping surface has a stud adapted to engage with a hole in the end of the saw blade to retain it against loss from the handle, and the other clamping member upon the corresponding clamping surface has a recess for receiving the end of said stud in closed clamping position of both clamping members.

3. A keyhole saw according to claim 1, wherein the one clamping member has an inner end surface extending outward from the fulcrum groove forming a stop for the other clamping member and the latter has a corresponding inner end surface extending transversely from the rounded inner end of said other clamping member and adapted to abut the stop and determine an open released position for the clamping members but effective to limit the opening of said other clamping member with respect to said one clamping member and prevent accidental loss of the latter by confining the inner end thereof between the interior of the hollow handle and the groove in the inner surface of said one clamping member while allowing sufficient opening to facilitate insertion of a saw blade between said members.

References Cited in the file of this patent

UNITED STATES PATENTS

| | | |
|---|---|---|
| 529,063 | Cope | Nov. 13, 1894 |
| 656,779 | Wilson | Aug. 28, 1900 |
| 2,286,530 | Fordon | June 16, 1942 |
| 2,309,816 | Allen | Feb. 2, 1943 |
| 2,696,233 | Huxtable | Dec. 7, 1954 |

FOREIGN PATENTS

| | | |
|---|---|---|
| 81,838 | Norway | May 26, 1953 |